US008464959B2

(12) United States Patent
Jin et al.

(10) Patent No.: US 8,464,959 B2
(45) Date of Patent: Jun. 18, 2013

(54) ELECTRONIC PRODUCT WITH SMART CARD

(75) Inventors: Linfang Jin, Shenzhen (CN); Menglong Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/569,355

(22) Filed: Aug. 8, 2012

(65) Prior Publication Data

US 2012/0292398 A1 Nov. 22, 2012

Related U.S. Application Data

(63) Continuation of application No. PCT/CN2011/070213, filed on Jan. 12, 2011.

(30) Foreign Application Priority Data

Feb. 9, 2010 (CN) ...................... 2010 2 0110642 U (51) Int. Cl.
*G06K 19/06* (2006.01)

(52) U.S. Cl.
USPC ......................................................... 235/492

(58) Field of Classification Search
USPC .......................................... 235/492, 486, 487
See application file for complete search history.

(56) References Cited

U.S. PATENT DOCUMENTS

| 5,603,629 | A * | 2/1997 | DeFrasne et al. | 439/331 |
|---|---|---|---|---|
| 6,450,408 | B2 * | 9/2002 | Shiue | 235/492 |
| 6,761,575 | B2 * | 7/2004 | Bricaud et al. | 439/326 |
| 7,823,790 | B1 * | 11/2010 | Valenzuela et al. | 235/486 |
| 2009/0047835 | A1 | 2/2009 | Lin | |

FOREIGN PATENT DOCUMENTS

| CN | 2699526 Y | 5/2005 |
|---|---|---|
| CN | 201130735 Y | 10/2008 |
| CN | 201340920 Y | 11/2009 |
| CN | 201340922 Y | 11/2009 |
| CN | 201608309 U | 10/2010 |
| CN | 201732892 U | 2/2011 |
| EP | 0742529 A2 | 11/1996 |
| EP | 2355004 A1 | 8/2011 |
| WO | WO 01/61790 A1 | 8/2001 |

OTHER PUBLICATIONS

EPO European Extended Search Report mailed Jun. 6, 2011, issued in related European Patent Application No. 11151702.5, Huawei Device Co., Ltd. (6 pages).
PCT International Search Report mailed Apr. 28, 2011, issued in related International Application No. PCT/CN2011/070213, Huawei Device Co., Ltd. (5 pages).
PCT Written Opinion of the International Searching Authority mailed Apr. 28, 2011, issued in related International Application No. PCT/CN2011/070213, Huawei Device Co., Ltd. (6 pages).
Communication pursuant to Article 94(3) EPC dated Jan. 9, 2013 in connection with European Patent Application No. 11 151 702.5.

* cited by examiner

*Primary Examiner* — Seung Lee (57) ABSTRACT

The present invention relates to a communication technology and discloses an electronic product with a smart card, which is designed for better preventing the deformation of the smart card due to overheating. The electronic product with a smart card includes a housing, a circuit board in the housing, a tray on the circuit board, a slot in the tray, a smart card in the slot, and an anti-deformation part on the housing for limiting the smart card or an anti-deformation part on the tray for fully limiting the smart card, thereby preventing the deformation of the smart card due to overheating. The present invention may be used for preventing the deformation of the smart card due to overheating.

10 Claims, 11 Drawing Sheets

ELECTRONIC PRODUCT WITH SMART CARD

CROSS-REFERENCE TO RELATED APPLICATION

This application is a continuation of International Application No. PCT/CN2011/070213, filed on Jan. 12, 2011, which claims priority to Chinese Patent Application 201020110642.4, filed on Feb. 9, 2010, both of which are hereby incorporated by reference in their entireties.

FIELD OF THE INVENTION

The present invention relates to a communication technology, and in particular, to an electronic product with a smart card.

BACKGROUND OF THE INVENTION

The smart card is a general term for plastic cards embedded with microchips. The smart card contains user information through which the cardholder can be identified. For example, according to different use scenarios, the existing smart cards may include Subscriber Identity Model (SIM) cards, User Identity Model (UIM) cards, and Universal Subscriber Identity Module (USIM) cards.

Among them, the SIM card is the personal data card of a Global System for Mobile communications (GSM) mobile phone and is used for the GSM system to recognize the user identity. A user can access the system and exchange information through the SIM card. The UIM card is a user identification and encryption technique for a mobile communication terminal, and is advocated by China Unicom and supported by the CDMA Development Group (CDG). The UIM card functions as the SIM card of a GSM mobile phone and may be used for user identification. The USIM card is an upgrade of the SIM card.

Figure 1:
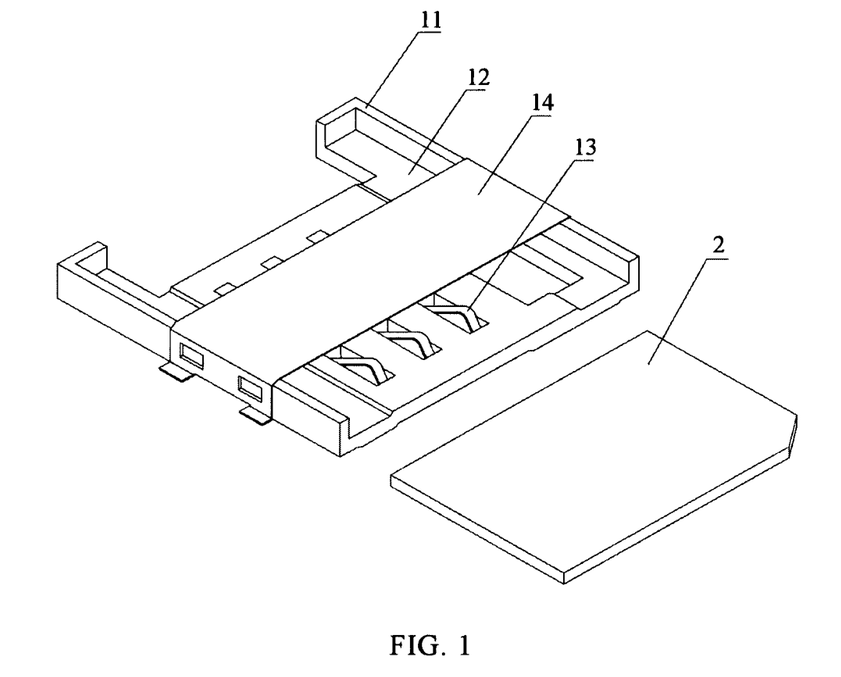
FIG. 1 is a structural diagram of an installation mode of a smart card in the prior art.

In general, a smart card should be installed in an electronic product which requires user identification. As illustrated in FIG. 1, one of the installation modes of a smart card in the prior art is to arrange a slot 12 in a tray 11 of the smart card and a smart card 2 in the slot 12, and contacts 13 on the bottom of the slot 12 to electrically connect to the smart card 2. In the position illustrated in FIG. 1, to limit the upward movement of the smart card 2, the tray 11 is also provided with a baffle 14 thereon.

A designer finds at least the following problems in the prior art during the implementation of the above installation.

Figure 2:
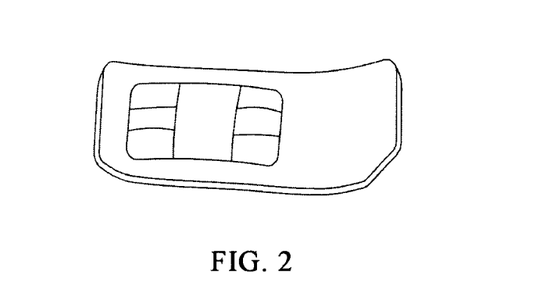
FIG. 2 is a deformation diagram of a heated smart card by using the installation mode illustrated in FIG. 1.

The smart card is easy to generate heat during the working process of the electronic product. Due to insufficient limitations to the smart card, and different coefficients of heat expansion of materials, as illustrated in FIG. 2, the applied force from the contacts may cause the smart card to warp at two ends and the applied force from the baffle may cause the smart card to be recessed in the middle. Therefore, the smart card tends to deform due to overheating.

SUMMARY OF THE INVENTION

Embodiments of the present invention provide an electronic product with a smart card for better preventing the deformation of the smart card due to overheating.

To achieve the objective above, the following technical solution is provided:

An electronic product with a smart card includes:
a housing, a circuit board in the housing, a tray on the circuit board, a slot in the tray, a smart card in the slot, and an anti-deformation part on the housing for limiting the smart card or an anti-deformation part on the tray for fully limiting the smart card, thereby preventing the deformation of the smart card due to overheating.

In the electronic product with a smart card, an anti-deformation part capable of limiting the smart card is arranged on the housing or tray, and the limiting effect of the anti-deformation part on the smart card can suppress the deformation tendency of the heated smart card; therefore, the deformation of the smart card due to overheating can be better avoided by the limiting effect provided by the anti-deformation part.

BRIEF DESCRIPTION OF THE DRAWINGS

To illustrate the technical solutions in the embodiments of the present invention more clearly, the accompanying drawings needed for describing the embodiments are introduced below briefly. Apparently, the accompanying drawings in the following descriptions merely show some of the embodiments of the present invention, and persons skilled in the art may obtain other drawings according to the accompanying drawings without creative efforts.

DETAILED DESCRIPTION OF THE EMBODIMENTS

The following describes the electronic product with a smart card in the embodiments of the present invention in detail with reference to the accompanying drawings.

It should be clear that the embodiments described are exemplary only, not covering all the embodiments of the present invention. Those skilled in the art can derive other embodiments from the embodiments given herein without making any creative effort, and all such embodiments are covered in the scope of the present invention.

The electronic product with a smart card in the embodiments of the present invention includes a housing, a circuit board in the housing, a tray on the circuit board, a slot in the tray, a smart card in the slot, and an anti-deformation part on the housing for limiting the smart card or an anti-deformation part on the tray for fully limiting the smart card, thereby preventing the deformation of the smart card due to overheating.

In the electronic product with a smart card, an anti-deformation part capable of limiting the smart card is arranged on the housing or tray, and the limiting effect of the anti-deformation part on the smart card can suppress the deformation tendency of the heated smart card; therefore, the deformation of the smart card due to overheating can be better avoided by the limiting effect provided by the anti-deformation part.

Figure 3:
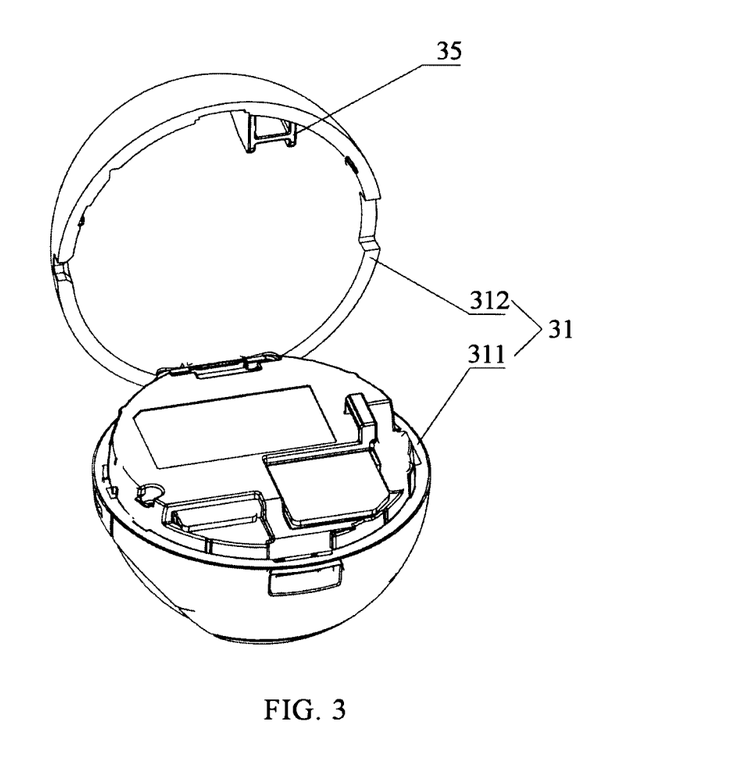
FIG. 3 is a structural diagram of an electronic product with a smart card in an embodiment of the present invention.
Figure 4:
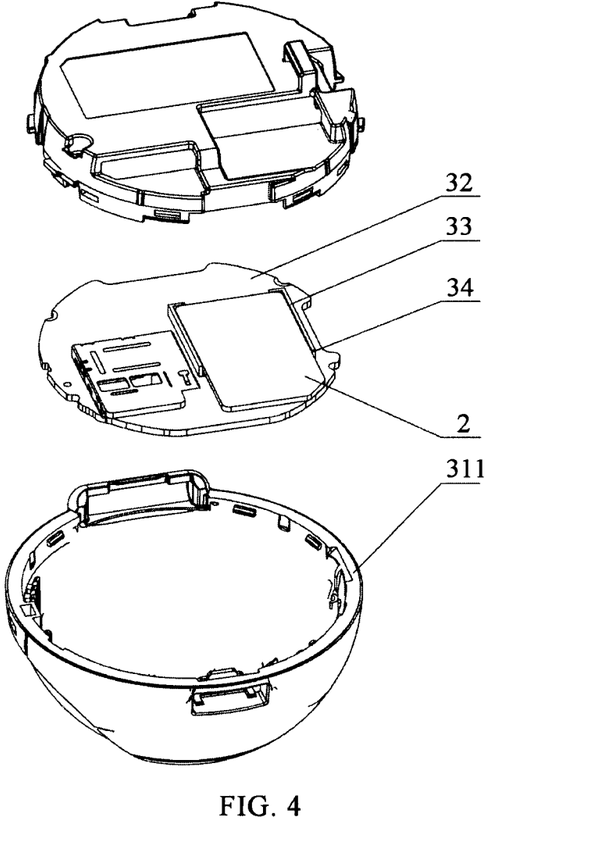
FIG. 4 is a decomposition diagram of the structure in a body illustrated in FIG. 3.

In particular, the electronic product with a smart card in the embodiment illustrated in FIG. 3 and FIG. 4 includes a housing 31, a circuit board 32 in the housing 31, a tray 33 on the circuit board 32, a slot 34 in the tray 33, and a smart card 2 in the slot 34. In the embodiment, the housing 31 includes a body 311, and a cover 312 fitted with the body 311; and the anti-deformation part is a limiting rib 35 arranged on the cover 312 and faces directly toward the smart card 2 when the cover 312 covers the body 311. Thus, in the position illustrated in FIG. 3, the smart card heated will be blocked by the bottom of the slot 34 when tending to deform downward and be blocked by the limiting rib 35 when tending to deform upward. In the embodiment, the limiting rib 35 provides a certain limiting effect on the smart card 2 so that the deformation due to overheating is better avoided.

On the other hand, this also increases the actual deformation temperature of the smart card 2. At present, the smart card can work for a long time at 70° C. and for a short time at 80° C. generally as prescribed. However, actually, some products will probably deform below 70° C. because the metal and plastic materials have different coefficients of heat expansion and insufficient limitations to the smart card 2. After the limiting rib 35 in the embodiment further limits the smart card 2, the actual deformation temperature of the smart card 2 can be increased from 70° C. to over 95° C.

It should be noted that, for a better limiting effect, the limiting rib 35 and smart card 2 can be fitted with each other in size to fully limit the smart card 2. Or, when the limiting rib 35 is obviously smaller than the smart card 2, multiple limiting ribs 35 may be distributed on the cover 312 corresponding to the installation position of the smart card 2 to fully limit the smart card 2.

In the embodiment, the distance between the limiting rib 35 and the smart card 2 is in the range of 0-0.4 mm. The distance of 0 mm means that the limiting rib 35 is directly propped against the smart card 2. The distance excluding 0 mm means a gap between the limiting rib 35 and the smart card 2. In the gap, the deformation of the smart card 2 is allowable within the limited range and will be limited by the limiting rib 35 if exceeding the limited range. In fact, the distance excluding 0 mm leaves certain deformation room for the smart card 2.

Figure 5:
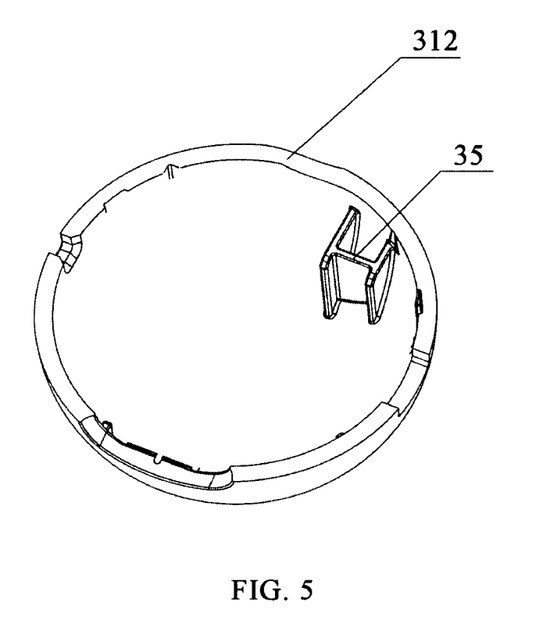
FIG. 5 is a structural diagram of a cover illustrated in FIG. 3.

From FIG. 5, it can be seen that a cross-section of the limiting rib 35 in the embodiment is I-shaped or H-shaped, because this shape not only can save materials and reduce weight, but also can meet the strength requirement. But not limited to this shape, in other embodiments of the present invention, the cross-section of the limiting rib 35 may be slot-shaped or plate-shaped.

Furthermore, in the embodiment, to improve the machinability, the limiting rib 35 and the cover 312 can be integrated.

Figure 6:
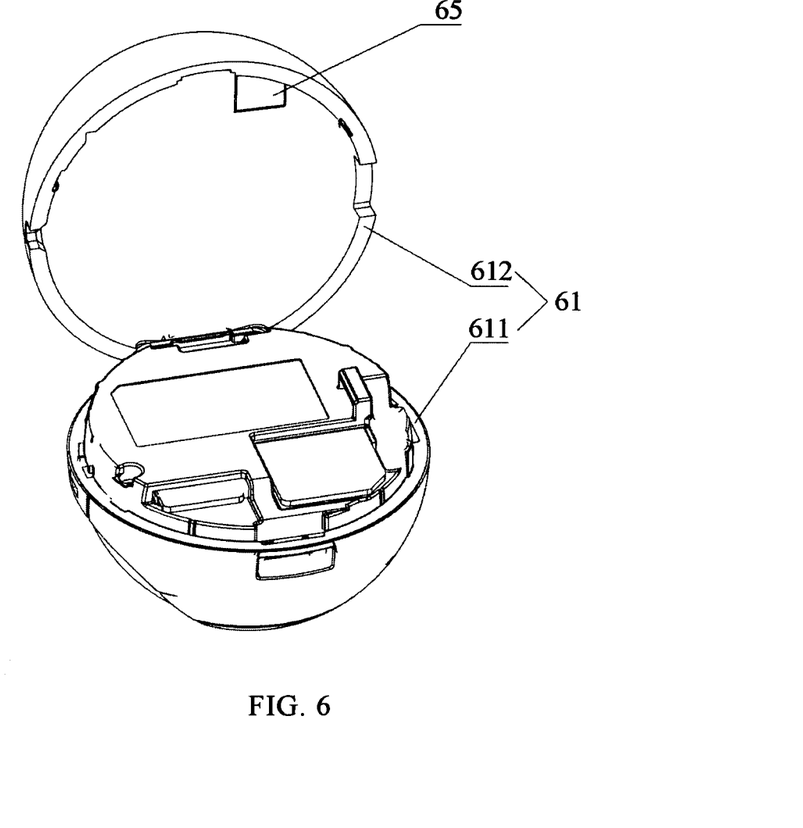
FIG. 6 is another structural diagram of the electronic product with a smart card in an embodiment of the present invention.
Figure 7:
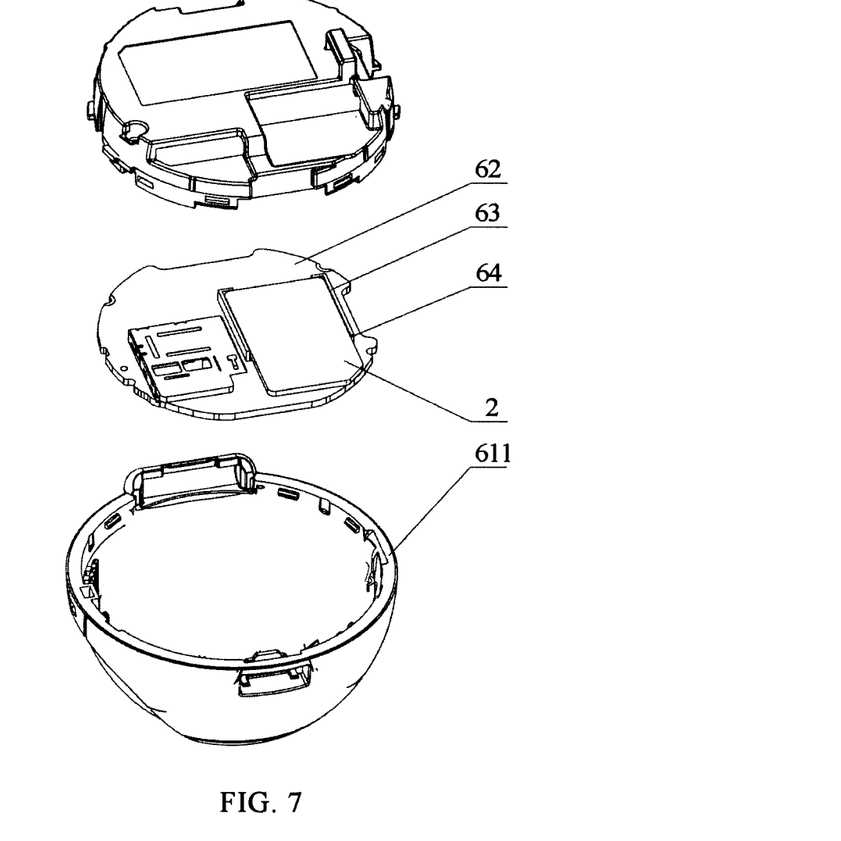
FIG. 7 is a decomposition diagram of a structure in a body illustrated in FIG. 6.

Moreover, the embodiment illustrated in FIG. 6 and FIG. 7 also provides an electronic product with a smart card. The electronic product in the embodiment includes a housing 61, a circuit board 62 in the housing 61, a tray 63 on the circuit board 62, a slot 64 in the tray 63, and a smart card 2 in the slot 64. In the embodiment, the housing 61 includes a body 611, and a cover 612 fitted with the body 611; and the anti-deformation part is an elastic limiting pad 65 arranged on the cover 612 and propped against the smart card 2 when the cover 612 covers the body 611. Thus, in the position illustrated in FIG. 6, the smart card heated will be blocked by the bottom of the slot 64 when tending to deform downward and be blocked by the elastic limiting pad 65 when tending to deform upward. In the embodiment, the elastic limiting pad 65 provides a certain limiting effect on the smart card 2 so that the deformation due to overheating is better avoided.

It should be noted that, for a better limiting effect, the elastic limiting pad 65 and smart card 2 can be fitted with each other in size to fully limit the smart card 2. Or, when the elastic limiting pad 65 is obviously smaller than the smart card 2, multiple elastic limiting pads 65 may be distributed on the cover 612 corresponding to the installation position of the smart card 2 so that the smart card 2 can be fully limited.

Figure 8:
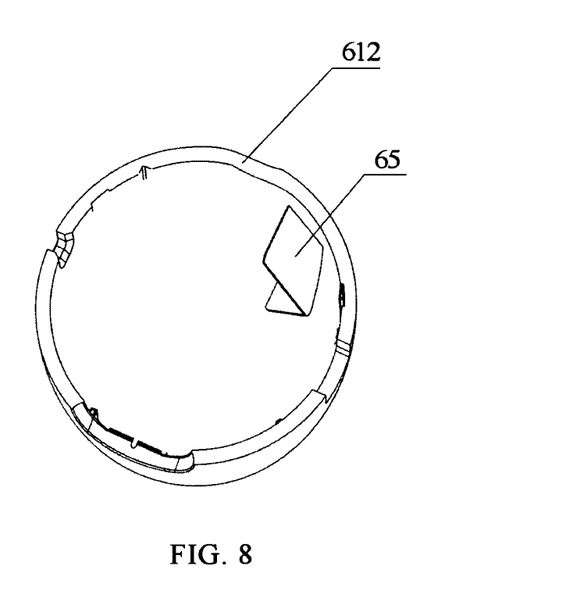
FIG. 8 is a structural diagram of a cover illustrated in FIG. 6.

From FIG. 8, it can be seen that the elastic limiting pad 65 is a spring made of metal or plastic materials. But not limited to such materials, in other embodiments of the present invention, the elastic limiting pad may also be rubber, sponge or foam. In the embodiment, with the elastic limiting pad 65, the deformation of the smart card 2 is allowable within the limited range and will be limited by the elastic limiting pad 65 if exceeding the limited range. Therefore, the utilization of the elastic limiting pad 65 leaves certain deformation room for the smart card 2.

Furthermore, in the embodiment, the connection between the elastic limiting pad 65 and the cover 612 includes, but is not limited to, screw connection, rivet connection, buckle connection, bond connection or splicing connection. The specific connection depends on the material of the elastic limiting pad 65 and the cover 612.

Figure 9:
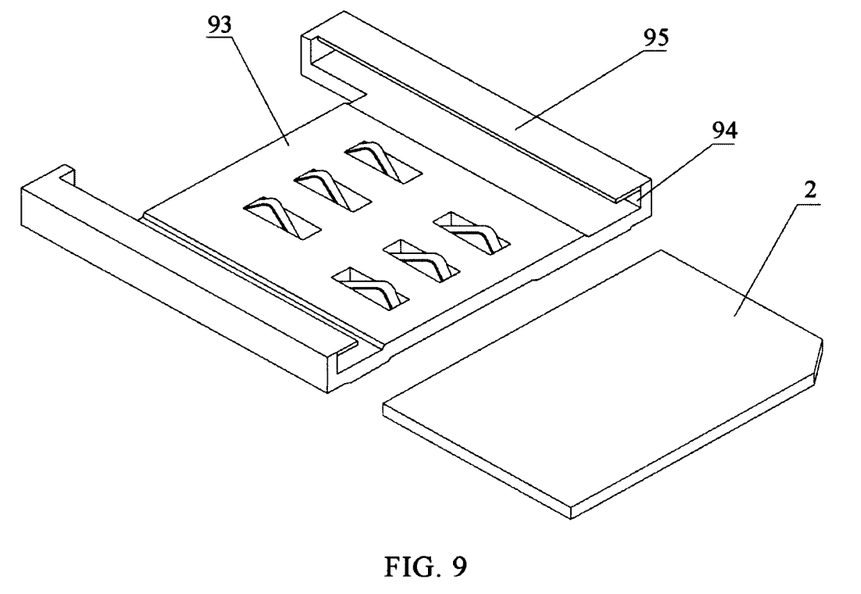
FIG. 9 is still another structural diagram of the electronic product with a smart card in an embodiment of the present invention.

The embodiment illustrated in FIG. 9 also provides an electronic product with a smart card. The structure of the electronic product in the embodiment is substantially the same as that of the electronic product in the embodiment illustrated in FIG. 3 or FIG. 6. Only the difference is described below, and the embodiment illustrated in FIG. 9 only shows the structure of the tray 93 that is used for installing the smart card 2 for clear illustration. To be specific, in FIG. 9, the tray 93 is provided with a slot 94, and the anti-deformation part is a flanged edge 95 arranged on the top of the slot 94, parallel with the bottom and extended to the inside of the slot 94.

When the smart card 2 works on the tray 93, two edges thereof are fully limited by the flanged edge 95 so that the edges of the smart card 2 are fully limited, thereby better suppressing the warping deformation on the edges of the smart card 2. For a better limiting effect, the flanged edge 95 may be bigger to cover a bigger area of the smart card 2.

Figure 10:
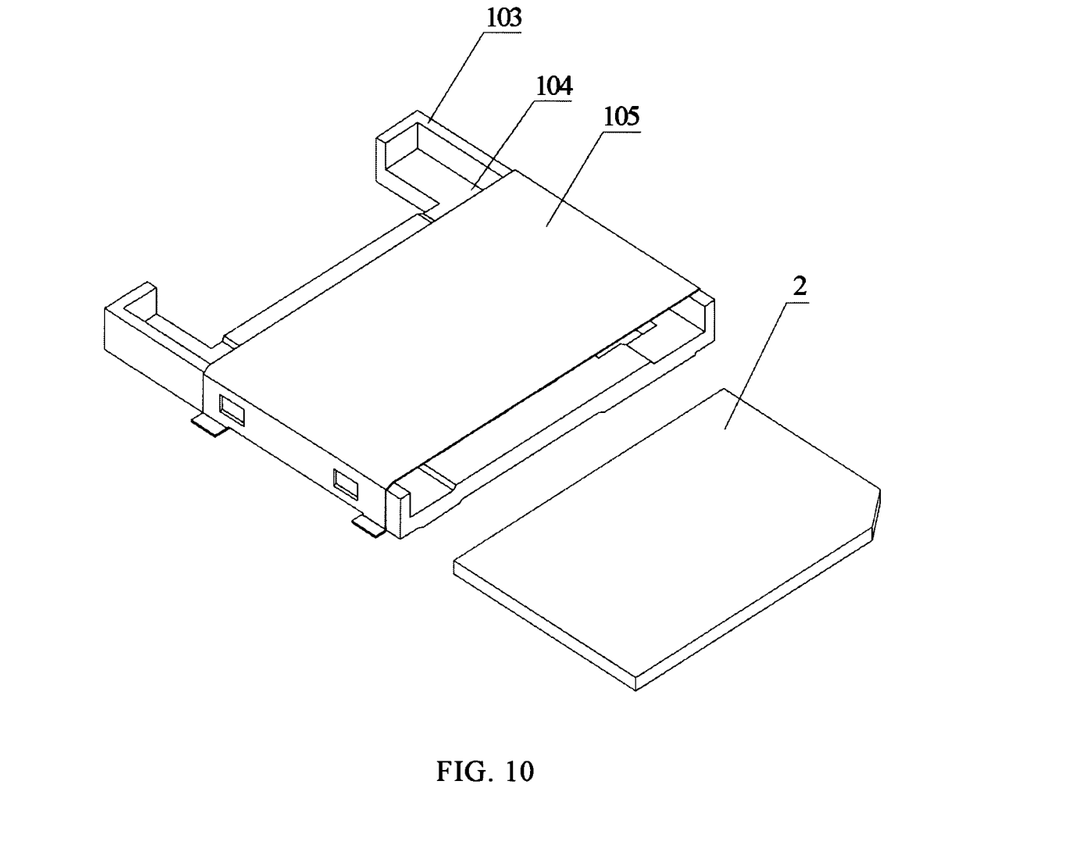
FIG. 10 is still another structural diagram of the electronic product with a smart card in an embodiment of the present invention.

The embodiment illustrated in FIG. 10 also provides an electronic product with a smart card. The structure of the electronic product in the embodiment is substantially the same as that of the electronic product in the embodiment illustrated in FIG. 3 or 6. Only the difference is described below, and the embodiment illustrated in FIG. 10 only shows the structure of the tray 103 that is used for installing the smart card 2 for clear illustration. To be specific, in FIG. 10, the tray 103 is provided with a slot 104, and the anti-deformation part is a baffle 105 arranged on the top and parallel with the bottom of the slot 104, and fitted with the smart card 2 in installation position and size.

Thus, the baffle 105 may fully limit the smart card 2 and better suppress the warping deformation of the smart card 2.

It should be noted that the smart card in the embodiment includes, but is not limited to, a SIM card, a UIM card, a USIM card, and a USIM Integrated Circuit Card (UICC).

Moreover, from the description above, it can be known that the smart card in the embodiment not only can be used in a mobile phone, but also can be used in an electronic product, such as a data card, which requires identification of the user identity. Therefore, the electronic product with a smart card in the embodiment includes, but is not limited to, a mobile phone and a data card.

Figure 11:
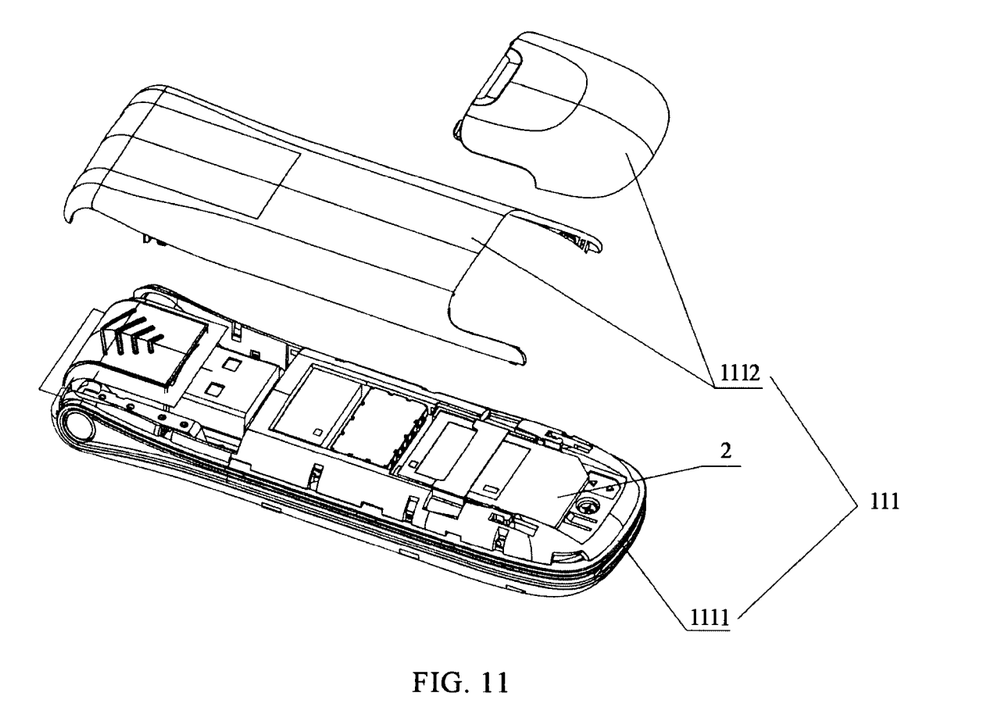
FIG. 11 is still another decomposition diagram of the electronic product with a smart card in an embodiment of the present invention.
Figure 12:
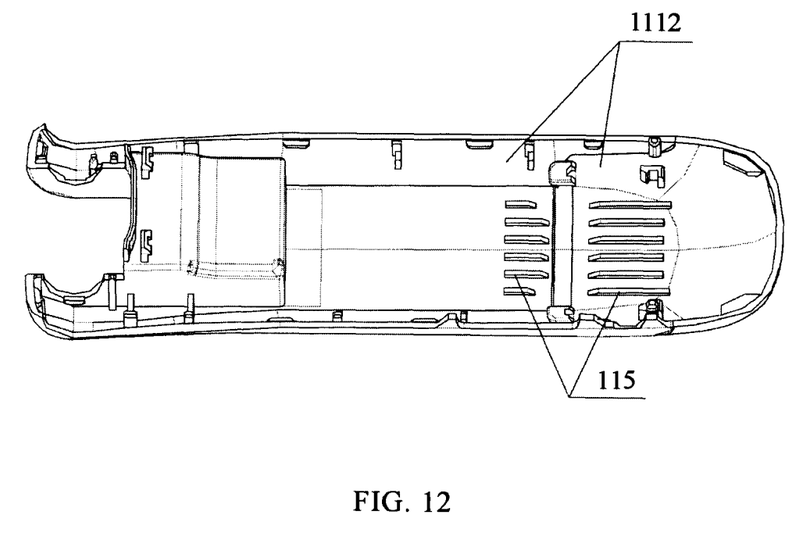
FIG. 12 is a structural diagram of a cover illustrated in FIG. 11.

In addition, it should be understood that the embodiments of the present invention are not limited to a spherical data card, and are also applicable to data cards of other shapes. For example, a bar-shaped data card illustrated in FIG. 11 is provided with a smart card 2 which is in a housing 111 composed of a body 1111 and a cover 1112. As illustrated in FIG. 12, the anti-deformation part is a bar limiting rib 115 arranged on the cover 1112 and capable of further limiting the smart card 2 to effectively prevent the deformation due to overheating. Moreover, in FIG. 12, the bar limiting rib 115 may be replaced with an elastic limiting pad.

To sum up, in the electronic product with a smart card, an anti-deformation part capable of limiting the smart card is arranged on the housing or tray, and the limiting effect of the anti-deformation part on the smart card can suppress the deformation tendency of the heated smart card; therefore, the deformation of the smart card due to overheating can be better avoided by a certain limiting effect provided by the anti-deformation part.

Although the present invention has been described through some exemplary embodiments and accompanying drawings, the present invention is not limited to such embodiments. It is apparent that those skilled in the art can make various modifications and variations thereto without departing from the scope of the present invention. The present invention shall cover the modifications and variations provided that they fall within the scope of protection defined by the following claims or their equivalents.

The foregoing specific embodiments are not intended to limit the present invention. For persons of ordinary skill in the art, any modification, equivalent replacement, and improvement made without departing from the principle of the present invention shall fall within the protection scope of the present invention.

What is claimed is:

1. An electronic product with a smart card, comprising a housing, a circuit board in the housing, a tray on the circuit board, a slot in the tray, a smart card in the slot, and an anti-deformation part on the housing for preventing deformation of the smart card due to overheating;
   wherein: the housing comprises a body, and a cover fitted with the body; and the anti-deformation part includes a limiting rib arranged on the cover, and arranged to face the smart card when the cover covers the body.

2. The electronic product according to claim 1, wherein a cross-section of the limiting rib is I-shaped, H-shaped, slot-shaped or plate-shaped.

3. The electronic product according to claim 2, wherein the limiting rib and the cover are integrated.

4. The electronic product according to claim 1, wherein the limiting rib is 0-0.4 mm away from the smart card.

5. The electronic product according to claim 4, wherein a cross-section of the limiting rib is I-shaped, H-shaped, slot-shaped or plate-shaped.

6. The electronic product according to claim 5, wherein the limiting rib and the cover are integrated.

7. An electronic product with a smart card, comprising a housing, a circuit board in the housing, a tray on the circuit board, a slot in the tray, a smart card in the slot, and an anti-deformation part on the housing for preventing deformation of the smart card due to overheating;
   wherein: the housing comprises a body, and a cover fitted with the body; and the anti-deformation part includes an elastic limiting pad arranged on the cover, and propped against the smart card when the cover covers the body.

8. The electronic product according to claim 7, wherein the elastic limiting pad includes a spring, rubber, sponge or foam.

9. The electronic product according to claim 8, wherein the elastic limiting pad and the cover are screwed, riveted, buckled, bonded or hot-melt to each other.

10. The electronic product according to claim 7, wherein the elastic limiting pad and the cover are screwed, riveted, buckled, bonded or hot-melt to each other.

* * * * *